United States Patent [19]
Halikias

[11] Patent Number: 5,585,779
[45] Date of Patent: Dec. 17, 1996

[54] CODED ANTI-THEFT VEHICLE ALARM AND DISABLING SYSTEM

[76] Inventor: Spiros Halikias, 86-17 88 Ave., Wood Haven, N.Y. 11421

[21] Appl. No.: 503,439

[22] Filed: Jul. 17, 1995

[51] Int. Cl.$^6$ ................................................ B60R 25/10
[52] U.S. Cl. .................. 340/426; 340/425.5; 340/430; 340/666; 340/667; 307/10.2; 307/10.3; 180/287
[58] Field of Search ........................ 340/426, 666, 340/667, 425.5, 428, 429, 430, 543, 825.32, 332; 307/10.2, 10.3, 10.4, 10.5; 180/287

[56] References Cited

U.S. PATENT DOCUMENTS

| | | | |
|---|---|---|---|
| 3,321,663 | 5/1967 | Williams | 340/667 |
| 3,650,347 | 3/1972 | Campos | 180/287 |
| 4,901,054 | 2/1990 | Waterman | 307/10.4 |
| 4,955,453 | 9/1990 | Nishioka et al. | 180/287 |
| 5,023,591 | 6/1991 | Edwards | 340/426 |
| 5,218,338 | 6/1993 | Chang | 340/426 |
| 5,304,979 | 4/1994 | Lima et al. | 307/10.4 |
| 5,319,351 | 6/1994 | Breezley, Jr. | 307/10.2 |
| 5,395,748 | 8/1994 | Wilson | 180/287 |
| 5,396,216 | 3/1995 | Morgan | 340/426 |
| 5,424,502 | 6/1995 | Williams | 340/667 |
| 5,444,430 | 8/1995 | McShane | 340/426 |

*Primary Examiner*—Jeffery Hofsass
*Assistant Examiner*—Van T. Trieu

[57] ABSTRACT

The system of the invention employs a control module in communication with a remote keyboard pad module and sensor housing, wherein typically a plurality of sensor housing are arranged, one mounted under a passenger and another under a drive portion of the associated vehicle seat, such that actuation of each or one of the sensors will effect actuation of an associated alarm upon failure to properly enter an associated numerical code into the keypad module upon lapse of an associated time interval. The sensors are arranged for mounting to the seat springs in a readily retrofit manner relative to an associated vehicle to orient the associated sensor plates of the sensor housing in proper orientation relative to the seat.

5 Claims, 3 Drawing Sheets

CODED ANTI-THEFT VEHICLE ALARM AND DISABLING SYSTEM

TECHNICAL FIELD

The field of invention relates to vehicle alarm structure arranged to prevent unauthorized usage of an associated vehicle, wherein the instant invention is particularly directed to the simultaneous actuation of an alarm and disabling of a vehicle's ignition system subsequent to a predetermined time lapse interval upon failing to enter a proper coded enumeration into an association control module.

BACKGROUND OF THE INVENTION

Prior art alarm structure is available relative to ignition disabling and alarm structure subsequent to a time interval, wherein such patents are exemplified by U.S. Pat. Nos. 4,180,043; 4,413,261; 4,992,670; 5,370,048; and 5,304,979. Each of said aforenoted patents are incorporated herein by reference relative to prior art circuitry directed to the interfacing of control module and coded entry system directed to effect actuation of an alarm and disabling of an ignition structure subsequent to a time lapse interval.

SUMMARY OF THE INVENTION

The system of the invention employs a control module in communication with a remote keyboard pad module and sensor housing, wherein typically a plurality of sensor housings are arranged, one mounted under a passenger and another under a drive portion of the associated vehicle seat, such that actuation of each or one of the sensors will effect actuation of an associated alarm upon failure to properly enter an associated numerical code into the keypad module upon lapse of an associated time interval. The sensors are arranged for mounting to the seat springs in a readily retrofit manner relative to an associated vehicle to orient the associated sensor plates of the sensor housings in proper orientation relative to the seat.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENT

Figure 1:
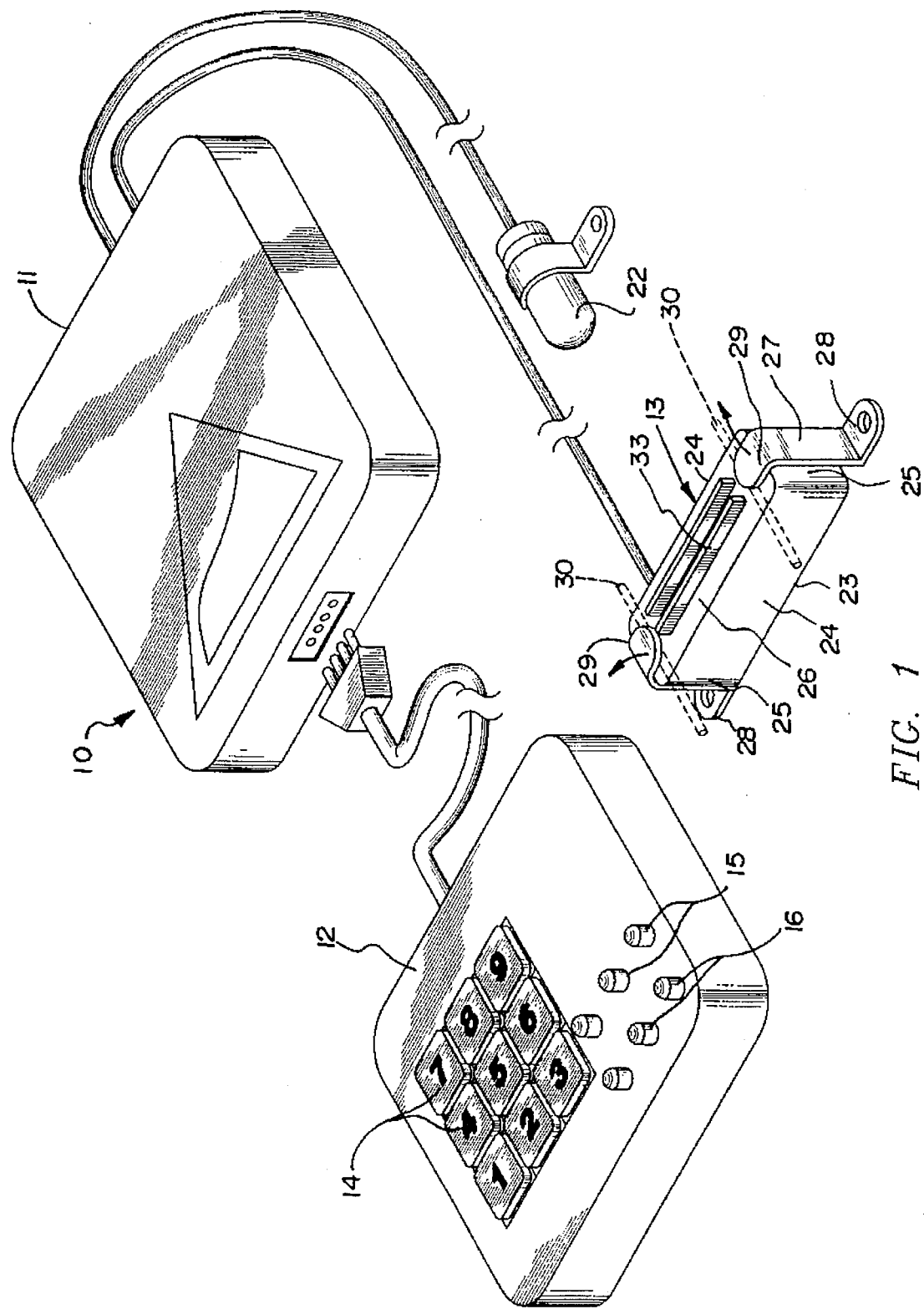
FIG. 1 is an isometric illustration of the invention employing at least one sensor.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The coded anti-theft vehicle alarm and disabling system 10 of the invention is arranged in cooperation with an associated vehicle, such that a vehicle car battery 20 (see FIG. 2) is arranged to provide for electrical energy to the associated main control mounted as is convenient within the associated vehicle passenger compartment or the like, cooperative with a control module 11 having a keyboard matrix 14 that are numbered sequentially to permit entry of a numerical code as desired into the keyboard module 12 to be synthesized by the control module 11. As noted, the prior art patents having such logic circuitry are exemplified by U.S. Pat. Nos. 5,307,048; 5,304,979; as well as U.S. Pat. Nos. 4,992,670; 4,413,261, and 4,180,043 incorporated herein by reference relative to the associated prior art circuitry available.

Figure 3:
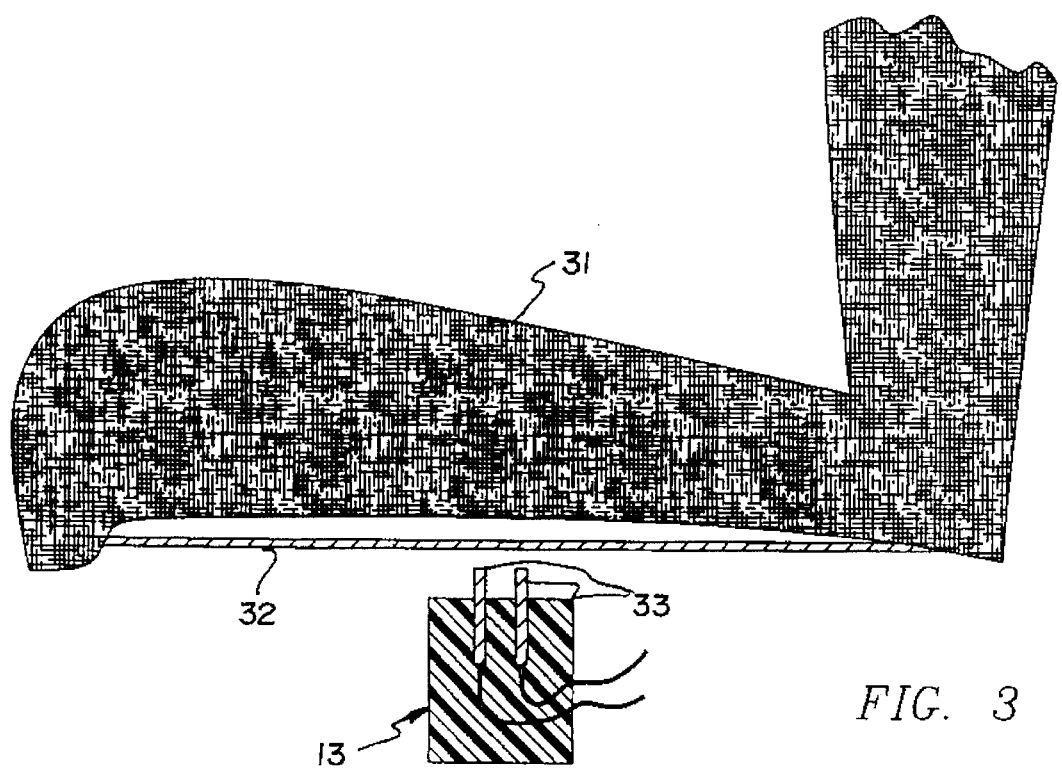
FIG. 3 is a side view, taken partially in section, indicating orientation of an associated sensor relative to a seat member.
Figure 4:
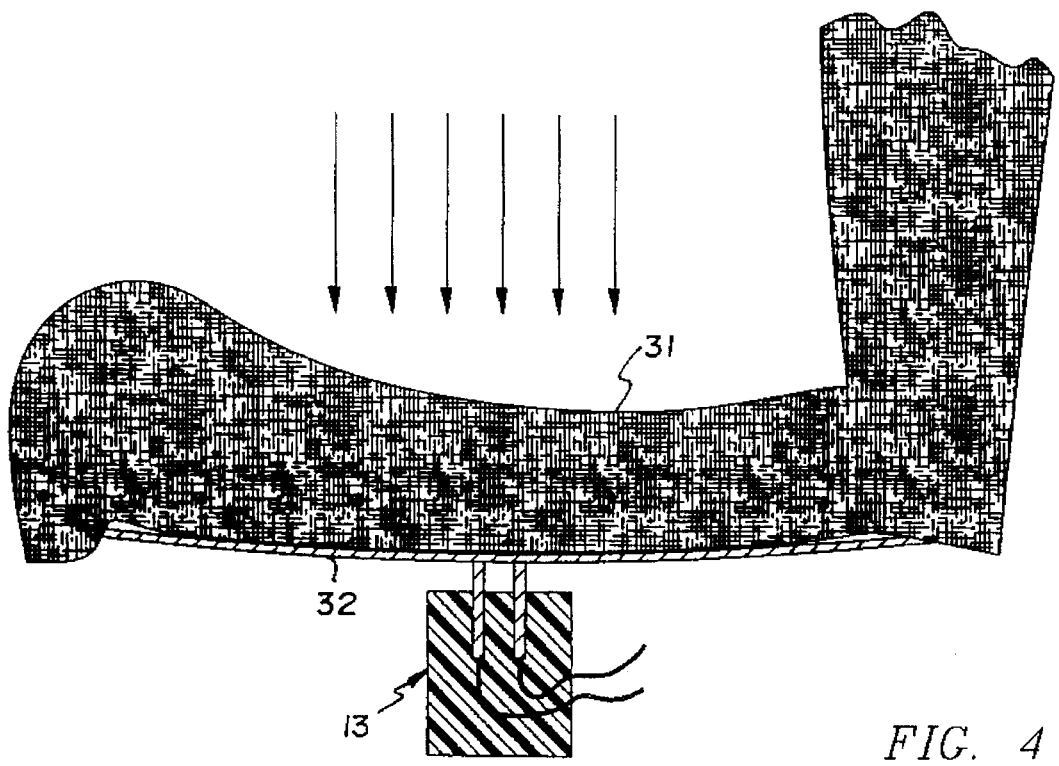
FIG. 4 is a side view, partially in section, of a seat structure, such as indicated in FIG. 3, compressed to actuate the associated sensor structure.

The keypad module 12 employs additionally respective first and second rows of LED lights 15 and 16 respectively, wherein the first lights 15 are illuminated upon an individual effecting actuation of an associated sensor housing 13 (see FIGS. 3 and 4), whereupon prior to a predetermined time delay such as ten seconds, twenty seconds, or the like, and upon entry of a proper code into the keypad module 12 to the keypad members 14, the second lights 16 are illuminated to indicate proper entry of the code. Should the proper code not be entered, an associated audible alarm 22 is actuated, as well as deactivation of the associated vehicle ignition switch 19 by the control module 11.

Figure 2:
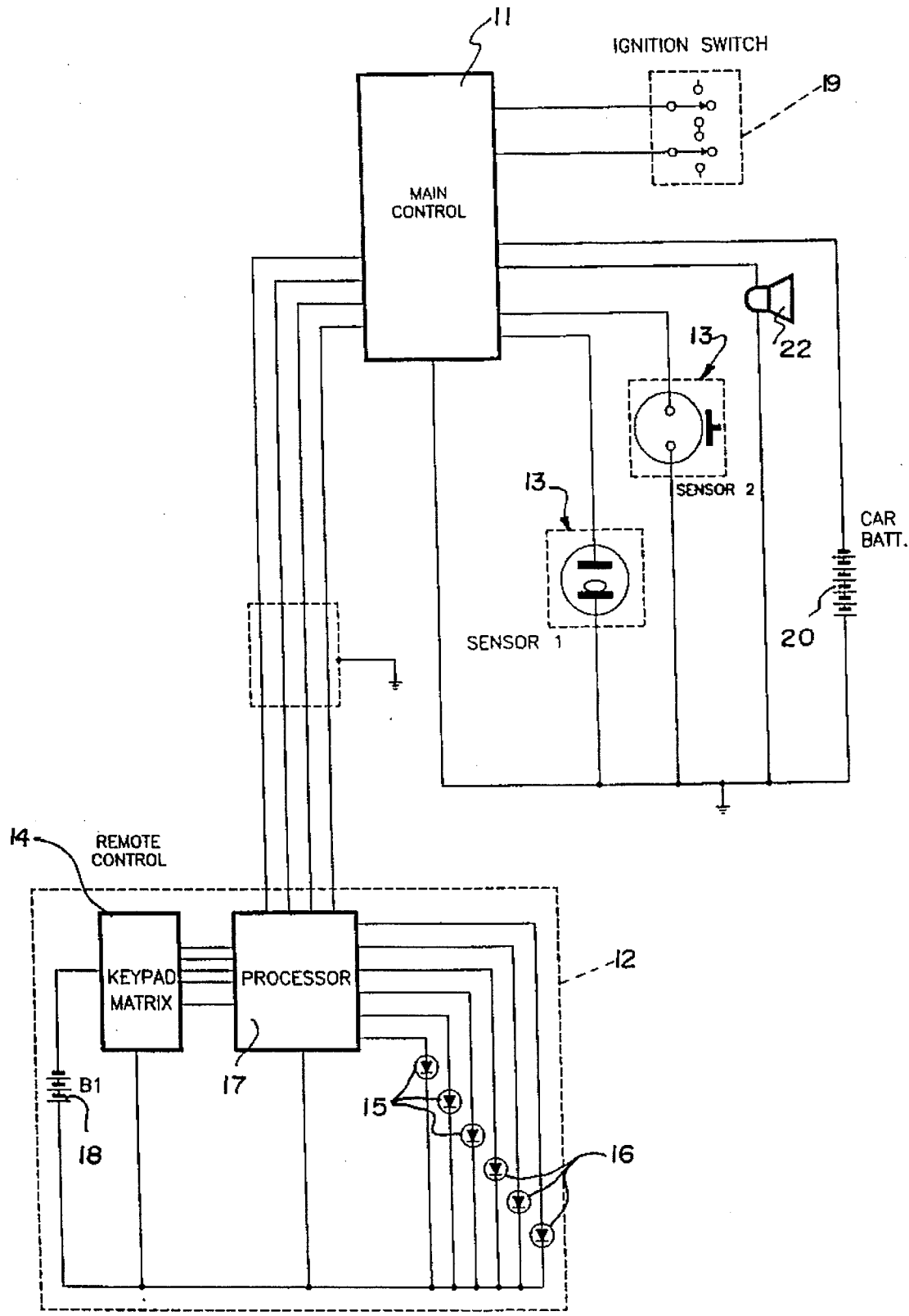
FIG. 2 is a diagrammatic illustration of the sensor and associated electrical communication between the associated components of the invention.

As illustrated in FIG. 2, the keypad module 12 is provided with an individual module battery 18 to provide for electrical energy to the associated LED lights 15 and 16, as well as the associated microprocess units 17 within the keypad module 12. Additionally, each of the sensor members 13 when a first and second sensor is employed, such as indicated in FIG. 2, may be of a mechanical type or a mercury switch type, but in either event each of the housings includes a housing bottom wall 23 spaced from a housing top wall 26, as well as housing side walls 24 and housing end walls 25. Each of the end walls 25 employs an end wall flange 27 fixedly mounted to a respective end wall and to this end, each end wall flange 27 employs a flange first end 28 extending in a coplanar relationship relative to the housing bottom wall 23. Each first end 28 typically employs an opening, such that mounting fasteners may be directed therethrough to permit as an option securement of an associated sensor to an underlying floor support. Additionally, each of the flanges 27 employs a flange second end plate 29 resiliently spring-biased to engage the top wall 26 but displaceable therefrom, such that an associated vehicle seat spring 30 may be received between a second end plate 29 and the associated housing top wall 26 for ease of mounting of the associated sensor housing 13 relative to the seat. To this end, each seat member 31 (see FIGS. 3 and 4) is provided with a metallic bottom plate 32 that upon deflection of the seat member 31 and the associated bottom plate 32 upon an individual sitting thereon, the sensor housing sensor plates 33 projecting from the top wall 26 are engaged by the bottom plate 32 to actuate an associated sensor housing 13 and thereby initiate the associated cycle of initially illuminating the first lights 15 awaiting entry of a proper code into the keypad module 12, whereupon lapse of a predetermined time interval effects actuation of an associated audio alarm member 22 to indicate unauthorized utilization of the associated vehicle while simultaneously disengaging the vehicle ignition switch 19 by way of the control module 11.

It is also submitted that the device of the instant invention may be provided with a shock sensor type of circuitry, such that should someone impart vibration to the associated vehicle such as to the breakage of a window and the like, the alarm would also be activated through a time delay of one minute for example or of any other associated time, at which point the other aspect of the circuitry would be activated to induce the alarm system of the invention.

Also variations to the device would include such aspects as a sensor type circuitry relative to the driver's seat, such as that upon the driver being seated, circuitry would indicate that an audible chip would indicate an alert such as "please enter secret code, you have fifteen seconds to do so" to indicate to the driver the need to immediately insert such a code to avoid activation of the alarm system of the invention.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by LETTERS PATENT of the United States is as follows:

1. A coded anti-theft vehicle alarm and disabling system arranged for mounting to a self-propelled vehicle, wherein the system comprises, a control module, a keypad module in electrical communication with the control module, and at least one sensor housing in electrical communication with the control module, the keypad module having a matrix of keypad members arranged to permit entry of a code into the keypad module for electrical communication to the control module, and at least a first light member in the keypad module arranged for illumination upon actuation of the sensor housing, and a second light member arranged for illumination upon proper entry of a code into the keypad module, and an alarm arranged for actuation by said control module subsequent to a predetermine time delay lapse absent proper entry of said code into the said keypad module, and said sensor housing having securement means for securing the sensor housing below an associated vehicle seat member.

2. A system as set forth in claim 1 wherein the seat member includes at least one spring member, and the securement means is arranged for securement to the spring member.

3. A system as set forth in claim 2 wherein the sensor housing includes a housing bottom wall spaced from a housing top wall and spaced housing end walls, wherein each of said end walls includes a flange, the flange having a first end extending in a coplanar relationship relative to said bottom wall, and the flange having a second end plate in biased contiguous communication with the housing top wall arranged to receive the spring member between the second end plate and the housing top wall.

4. A system as set forth in claim 3 wherein the seat member includes a metallic bottom plate secured to the seat member in a spaced orientation in a first position relative to the sensor housing, and the seat member bottom plate arranged to engage the sensor housing to effect actuation of the sensor housing.

5. A system as set forth in claim 4 wherein at least one sensor plate extends from the housing top wall to engage the bottom plate when the bottom plate is deflected from the first position to a second position.

* * * * *